Sept. 29, 1970  T. E. HOLLAND ET AL  3,531,204
OPTICAL ENCLOSURES OF THE INTERFEROMETER TYPE
Filed Nov. 8, 1966  2 Sheets-Sheet 1

Thomas E. Holland
Willard E. Buck
Inventors
by Alfred H. Green
Attorney

United States Patent Office 3,531,204
Patented Sept. 29, 1970

3,531,204
OPTICAL ENCLOSURES OF THE INTERFEROMETER TYPE
Thomas E. Holland, Sunnyvale, and Willard E. Buck, Los Gatos, Calif., assignors to Technical Operations, Incorporated, Burlington, Mass., a corporation of Delaware
Filed Nov. 8, 1966, Ser. No. 592,800
Int. Cl. G01b 9/02; G02f 1/28
U.S. Cl. 356—112                                    12 Claims

ABSTRACT OF THE DISCLOSURE

An optical enclosure bounded by first and second spaced-apart partially transparent mirrors having between them a lens system for imaging each mirror on the other. The lens system focuses light from the first mirror substantially to a point between the lens system and the second mirror, and the second mirror is concavely curved on a radius centered at that point. The lens system is preferably of a type which has the ability to focus collimated light substantially equally from either direction. A reversed Steinheil doublet corrected for spherical aberration for parallel light passing in either direction is preferred. The enclosure is illuminated through the first mirror, for example, by a laser. The first mirror may be plane, concave, or convex; if concave, it is curved on a radius longer than the distance to the first-named point.

CROSS REFERENCE TO RELATED APPLICATION

This invention relates to high-resolution optical interferometers using multiply-reflected light propagating along a plurality of paths between two reflectors, and is an improvement upon the interferometers disclosed in the application of Thomas E. Holland, one of the present applicants, filed Apr. 15, 1965, Ser. No. 448,359, now Pat. No. 3,432,239.

BACKGROUND OF THE INVENTION

Optical instruments of the interference type as described in both of the aforementioned applications are the proximate background of the present invention, which represents improvement by reducing the number of parts required to achieve the same results while improving optical stability.

OBJECTS OF THE INVENTION

It is thus the principal object of the invention to provide improved optical instruments of the interference type.
Another object is to provide a new and simplified multi-pass optical interferometer.
A further object is to provide such an improved interferometer which is made of a small number of parts, has improved optical stability, and a wide range of uses.

BRIEF DESCRIPTION OF THE DRAWINGS

These and other objects and features of the invention will be apparent from the following description of several exemplary embodiments. This description refers to the accompanying drawings, in which.

DESCRIPTION OF THE PREFERRED EMBODIMENTS

Figure 1:
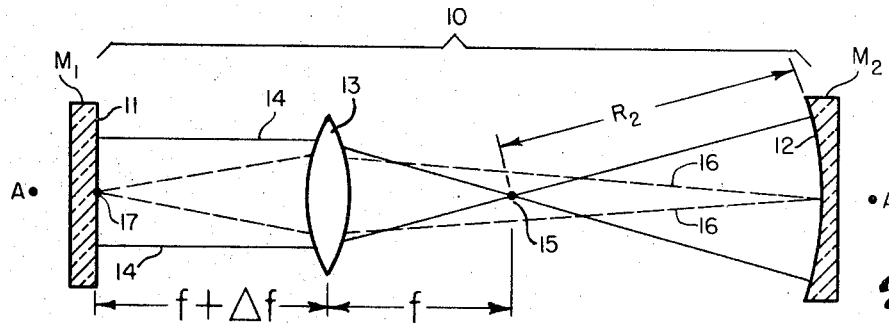
FIG. 1 illustrates the general principal of the invention as applied to a first embodiment of it.

In FIG. 1 an optical interferometer cavity generally designated by the reference character 10 is bounded by a plane mirror $M_1$ and a concave mirror $M_2$. These are partially transparent mirrors, having a high order of specular reflectance for the light intended to be used, and each is a transparent glass body appropriately treated for reflectance at its inner surface 11 and 12, respectively, for example by silvering. A lens system, represented by the single lens 13 which is shown, is located between the mirrors $M_1$ and $M_2$, for the purpose of imaging each mirror on the other, in the manner taught in the aforementioned application of Holland. Light from the first mirror $M_1$, indicated as collimated light by ray lines 14 is focused to a point 15 on the axis A—A of the system. The second mirror $M_2$ is arcuately curved on the radius $R_a$ which is centered at point 15. If light from the first mirror $M_1$ is collimated, as shown, the point 15 is spaced a focal length away from the lens system, as shown in FIG. 1. The distance between the reflecting surface 11 of the first mirror $M_1$ and the lens system 13 is adjusted so that the lens system will focus light (rays 16) from a point on the reflecting surface 12 of the second mirror $M_2$ to a diffraction-limited spot 17 on the reflecting surface of the first mirror. Owing to the distance between the second mirror and the lens system, the rays 16 traced from a point on the second mirror to the lens system are nearly parallel, but since the second mirror is not at infinity, the distance between the lens system and the first mirror is greater than the focal length by a small increment.

Figure 2:
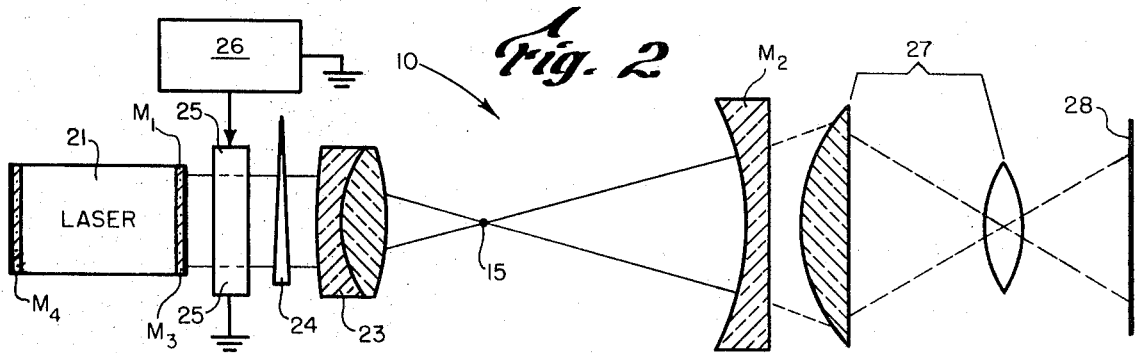
FIG. 2 shows the invention as used in an optical beam swinger coupled to a laser through a common mirror.
Figure 3:
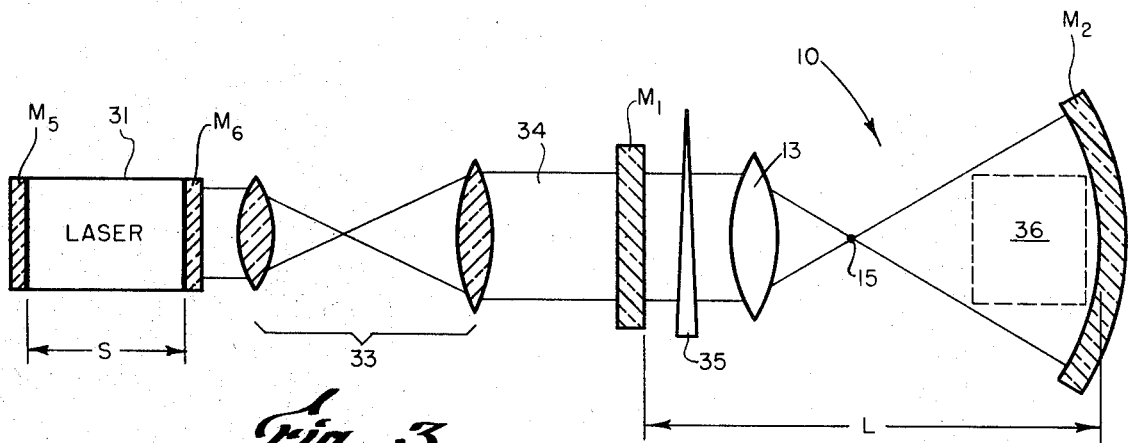
FIG. 3 shows the invention as used in a test instrument coupled to a laser.

The optical enclosure shown in FIG. 1 may be illuminated by a light from a laser, through the first mirror $M_1$ and such light can be a collimated beam as is indicated in FIGS. 2 and 3, to be described below. The lens system 13, which images the input mirror onto the output mirror and vice versa can be required to work at large magnification. When the optical enclosure is used as a multi-pass interferometer, a pattern of fringes will appear across the aperture of the second mirror $M_2$. For a magnification of the order of 30, and 12 to 15 fringes across the second mirror $M_2$, the angular field at the first mirror $M_1$ will be about six degrees. This is a large field for a single achromat. However a very considerable benefit is derived from the symmetry of this system. Because of the symmetry, the coma and the distortion will be essentially zero, and astigmatism will be reduced. With proper choice of glass, the field curvature can also be eliminated. If the lens system 13 is a reversed Steinheil doublet, (illustrated in FIG. 2) corrected for spherical aberration for parallel light passing in either direction, the same benefits from symmetry hold for the other aberrations. This lens and the first mirror $M_1$ form a nearly linear system such that the astigmatism introduced by the second mirror $M_2$ is cancelled every other pass through the system and therefore is not cumulative. The system of the present invention in this respect is fundamentally different from systems employing optical enclosures bounded by a pair of concave confocal mirrors, where the astigmatism is cumulative. A system according to FIG. 1, employing a reversed Steinheil doublet, as the lens means 13, has been constructed and tested. The diffraction pattern observed on axis, and at two degrees and six degrees off axis, respectively, had no trace of coma or astigmatism. This system thus appears to have resolution which is essentially finesse limited.

FIG. 2 shows an optical enclosure according to the invention in a beam swinger system, according to the aforementioned application of Willard E. Buck. A laser 21 which is representative of any suitable laser, comprising a negative temperature medium (not shown) within an optical enclosure bounded by partially transparent mirrors $M_3$ and $M_4$, is used to supply light for the system. The optical enclosure according to the present invention, bounded by mirrors $M_1$ and $M_2$ has mirror $M_1$ in common with mirror $M_3$ of the laser; that is mirrors $M_1$ and $M_3$ are embodied in the same partially-reflecting surface. The laser thus feeds the optical enclosure 10 directly. The lens system 23 in the optical enclosure 10 is a reversed Steinheil doublet, the properties of which are described in "Applied Optics and Optical Design" by A. E. Conrady, part two, pages 523–525 and pages 761 to 766, published by Dover Publications, Inc., New York in 1960.

The optical enclosure 10 may include a phase-taper element 24 to establish a pattern of interference fringes (not shown) on the mirror $M_2$ in the presence of multipass propagation of light from the laser 21 between the mirrors $M_1$ and $M_2$. Preferably, in order to avoid needlessly introducing an optical element, the same effect is achieved by tilting the second mirror $M_2$ relative to the system axis. Means to change the refractive index of a portion of the path between the mirrors $M_1$ and $M_2$ comprises a Kerr cell 25 and a deflection voltage generator 26, connected together as shown. The effect of altering the refractive index of a portion of the path within the optical enclosure 10 is to shift the pattern of fringes appearing across the face of the second mirror $M_2$. Optical means 27 are provided beyond the second mirror $M_2$ for displaying the fringe pattern on a screen 28 where it may be viewed or photographed, as desired.

The light source for the system of FIG. 2 can be a helium neon gas laser or any other light source of sufficiently long temporal coherence. Large temporal coherence is desired for the reasons mentioned in both of the aforementioned applications, namely to assure that sharp interference fringes are obtained through multiple reflections within the optical enclosure 10 over a long optical path, approximately 200 or more passes through the system by these reflections being preferable in order to obtain sharp fringes. Accordingly the light source 10 should have a coherence length many times the distance between the two mirrors $M_1$ and $M_2$ of the optical enclosure 10. The light is also quasi-monochromatic, and can be fully described as substantially coherent quasi-monochromatic light.

In FIG. 3 the optical enclosure of the invention has its mirrors $M_1$ and $M_2$ separated by a distance L and is fed with light by a laser system 31 the optical enclosure of which is bounded by mirrors $M_5$ and $M_6$ which are separated by a distance S. In FIG. 3 the laser mirrors and the optical enclosure mirrors are entirely separate, and a telescopic system 33 is employed between them to adjust the diameter of the collimated beam 34 which is supplied to the optical enclosure 10 through the first mirror $M_1$. A phase-taper element 35 may be provided in order to establish a pattern of interference fringes (not shown) in the aperture of the second mirror $M_2$. Again, as in FIG. 2, the same effect is preferably achieved by tilting one of the mirrors, here preferably the second mirror $M_2$, relative to the system axis. A test section 36 is provided in the optical enclosure 10 closely adjacent the second mirror $M_2$, for the examination of articles or phenomena which will perturb the index of refraction of a portion of the path within the optical enclosure 10, as is described and shown in the aforementioned patent of Holland.

The optical path length L between the first and second mirrors $M_1$ and $M_2$ of the optical enclosure is preferably an integral multiple of the optical path length S between the mirrors $M_5$ and $M_6$ of the laser enclosure. This relationship is desirable for the reasons set forth in the aforementioned patent of Holland, namely that it avoids the appearance of multiple fringe systems at the second mirror $M_2$.

Figure 4:
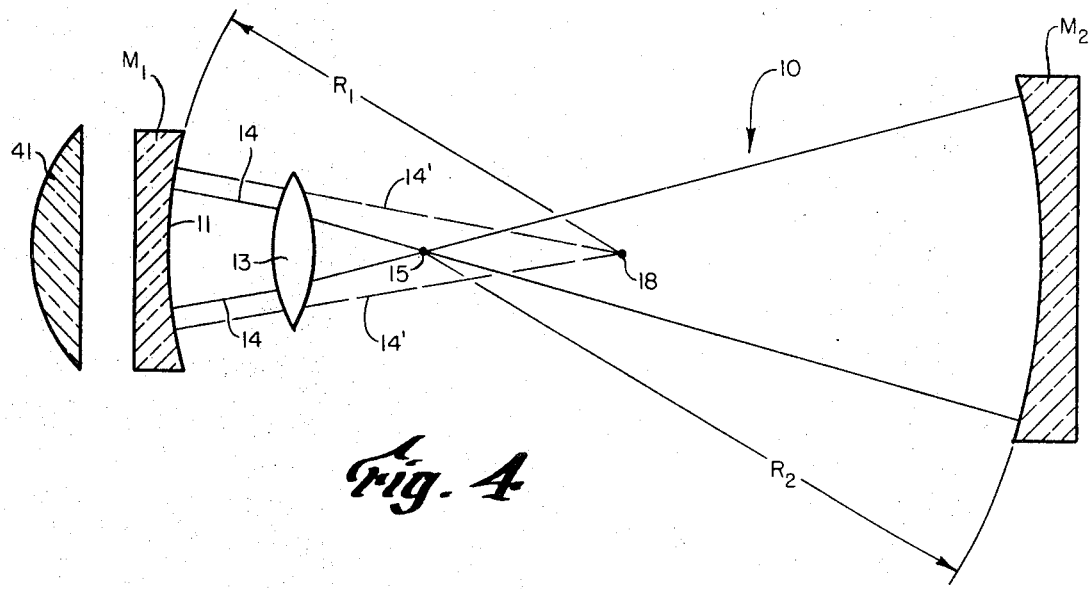
FIG. 4 shows a second embodiment of the optical enclosure of the invention.

In FIG. 4 the reflecting surface 11 of the first mirror $M_1$ of the optical enclosure 10 is concaved, and is arcuately curved on a radius $R_1$ which is centered at a point 18 beyond the center of curvature 15 of the second mirror $M_2$. The lens system 13 is adjusted to focus the mirrors $M_1$ and $M_2$ one on the other. Rays normal to the surface of the first mirror $M_1$ will, if undeviated come to a focus at the center of curvature 18, as illustrated by dashed lines 14'. The lens system 13 focuses such rays to the point 15, which in this case is closer than the focal length of the lens system because multiply-reflected light within the optical disclosure converges from the first mirror $M_1$ to the lens system. The lens 41 outside the optical enclosure adjacent the first mirror $M_1$ may be used for coupling the optical enclosure to a source of illumination.

Figure 5:
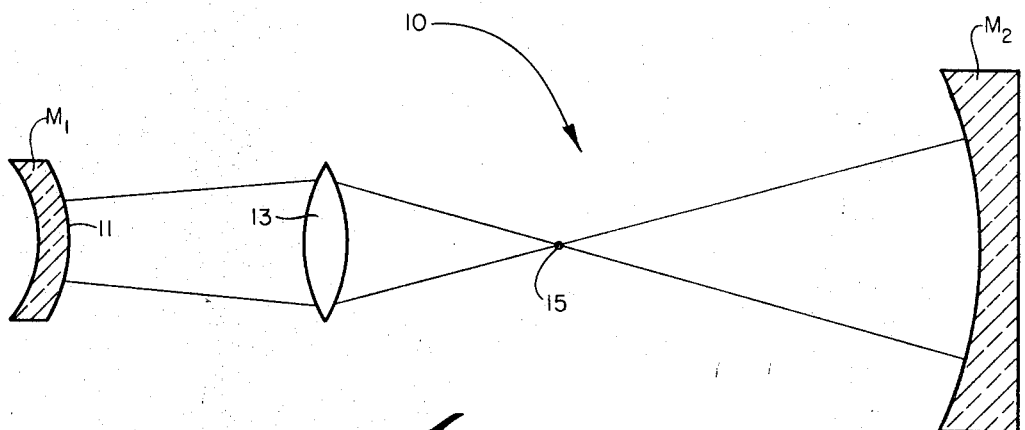
FIG. 5 shows a third embodiment of the optical enclosure of the invention.

In FIG. 5 the reflecting surface 11 of the first mirror $M_1$ is convexly curved, and the point 15 is consequently located beyond the focal length of the lens system 13. Otherwise FIG. 5 is similar to FIG. 1.

The general properties of the invention may be summarized as follows:

(1) The lens system 13 should preferably image a collimated or a nearly-collimated light beam at a diffraction-limited spot 15.

(2) The lens system 13 should image the first mirror $M_1$ on the second mirror $M_2$ and vice versa. These properties should exist equally in either direction. A symmetrical lens system will do this, but symmetrical lens systems generally have three or more elements, and this gives rise to undesirable multiple reflections. A reversed Steinheil doublet is a non-syymmetrical lens system which also will do this, using two components cemented together. The rays 14, shown in FIG. 1 as parallel, are brought to a focus at a difffraction-limited spot 15 which in FIG. 1 is the focal length away from the lens system 13. The rays from a point on the second mirror $M_2$ (illustrated as rays 16—16 in FIG. 1) arrive at the lens system 13 nearly parallel to each other owing to the distance between the second mirror and the lens system, and are brought to a focus at a diffraction-limited spot 17 on the first mirror $M_1$. This condition is equally true for all the illustrated embodiments of the invention. This spot is in each case substantially the focal length plus a small increment away from the lens system 13, since in each embodiment the second mirror $M_2$ is not at infinity.

The foregoing description of certain embodiments of the invention is by way of example only, and not intended to limit the scope of the appended claims. No attempt has been made to illustrate all possible embodiments of the invention, but rather only to illustrate its principles and the best manner presently known to practice it. Therefore, such other forms of the invention as may occur to one skilled in this art on a reading of the foregoing specification are also within the spirit and scope of the invention, and it is intended that this invention include all modifications and equivalents which fall within the scope of the appended claims.

We claim:

1. In a multiple beam interferometer an optical enclosure bounded by first and second spaced-apart partially transparent mirror means having between them a positive power imaging means for imaging each of said mirror means on the other, the improvement comprising, said imaging means being located closer to said first mirror means than to said second mirror means such that the image of said first mirror means on said second mirror means produced by said imaging means is magnified and such that light wavefronts originating outside said enclosure and propagating through said first mirror means are focused substantially to a point between said lens system and said second mirror means, said second mirror means being concavely curved on a radius longer than the focal length of said imaging means and centered substantially at said point.

2. An optical enclosure according to claim 1 in which said first mirror means is planar.

3. An optical enclosure according to claim 1 in which said first mirror means is concavely curved on a radius centered at a second point beyond said first-named point.

4. An optical enclosure according to claim 1 in which said first mirror means is convexly curved.

5. An optical enclosure according to claim 1 in which said imaging means has the ability to focus collimated light substantially equally well from either direction.

6. An optical enclosure according to claim 5 in which said imaging means is symmetrical.

7. An optical enclosure according to claim 5 in which said imaging means is a non-symmetrical reversible doublet.

8. An optical system comprising a first optical enclosure according to claim 1 in combination with a laser system having a second optical enclosure bounded by third and fourth partially transparent mirror means for providing through said third mirror means an extended source of substantially coherent quasi-monochromatic light for illuminating said first enclosure through said first mirror means.

9. An optical system according to claim 8 in which said first mirror means and said third mirror means are the same entity.

10. An optical system according to claim 8 in which the optical path length between said first and second mirror means is substantially an integral multiple of the optical path length between said third and fourth mirror means.

11. System for producing an optical interference pattern which is shiftable in position, comprising an optical enclosure according to claim 1 for multiple-pass propagation of light between said mirror means to produce said pattern, means between said mirror means to vary the optical path length between them for said light, and external control means coupled to said path length varying means and operable therethrough to vary said path length and thereby to shift said pattern.

12. An optical system according to claim 11 in which said path length varying means includes an element which is transparent to said light, and of which the index of refraction can be varied to alter said optical path length.

References Cited

UNITED STATES PATENTS

| | | | |
|---|---|---|---|
| 2,769,371 | 11/1956 | Gilkeson | 350—232 |
| 3,437,398 | 4/1969 | Muller et al. | 520—232 |
| 3,247,467 | 4/1966 | Geusic et al. | 331—94.5 |
| 3,274,512 | 9/1966 | Okaya | 331—94.5 |
| 3,286,193 | 11/1966 | Koester et al. | 331—94.5 |
| 3,293,565 | 12/1966 | Hardy | 331—94.5 |
| 3,402,633 | 9/1968 | Herriott | 331—94.5 |

RONALD L. WIBERT, Primary Examiner

V. P. McGRAW, Assistant Examiner

U.S. Cl. X.R.

350—160; 356—129